United States Patent Office 3,703,598
Patented Nov. 21, 1972

3,703,598
PURIFICATION OF p-AMINOPHENOL
Frank A. Baron, Short Hills, N.J., assignor to
Mallinckrodt Chemical Works, Lodi, N.J.
No Drawing. Filed Nov. 4, 1969, Ser. No. 874,072
Int. Cl. C07c *85/16, 91/44*
U.S. Cl. 260—575                               10 Claims

ABSTRACT OF THE DISCLOSURE

A process for the purification of crude p-aminophenol by recrystallization from aqueous polyfunctional mild acids, including phosphoric, lactic, glycolic and citric acids.

BACKGROUND OF THE INVENTION

The present invention relates to the purification of p-aminophenol (PAP). More specifically it provides a method by which crude p-aminophenol can be treated to obtain the purified material. Also, it provides a method for the purification of p-aminophenol obtained by reduction of nitrobenzene.

p-Aminophenol is a well known and highly useful industrial chemical. Principal uses for the material are as an intermediate in the production of dyestuffs and photographic chemicals and as an intermediate in the production of pharmaceuticals.

There are a number of well known methods for the production of p-aminophenol involving the reduction of nitrobenzene. Other methods conventionally involve the reduction of nitrophenol. In regard to these prior processes there may be mentioned those disclosed in U.S. Pats. 2,198,249 and 2,765,342.

In Pat. No. 3,383,416, issued May 14, 1968 there is disclosed a particularly advantageous process for the catalytic hydrogenation of nitrobenzene in aqueous sulfuric acid. In accordance with the process of this patent, the reduction of the nitrobenzene is interrupted prior to completion. The interruption occurs at a time when the reaction product mixture contains a sufficient amount of unreacted nitrobenzene to form an immiscible layer of nitrobenzene containing a reaction catalyst suspended therein. A separate aqueous layer contains the p-aminophenol product as a salt. The aqueous layer is separated from the nitrobenzene layer and the p-aminophenol is isolated from the aqueous layer while the nitrobenzene layer is recycled to the hydrogenation zone.

A difficulty which is encountered in these catalytic hydrogenation processes is that the p-aminophenol is present in the crude reaction mixture along with numerous side products. Some of these side products such as non-phenolic amines, caustic insoluble substances, and the like, may interfere with the preparation of pure derivatives of p-aminophenol, e.g., N-acetyl p-aminophenol.

Particularly disadvantageous side products are the polymeric, tar-like materials and polymer precursors produced during the catalytic hydrogenation process and during the subsequent work-up steps. An exact characterization of the polymeric materials is impossible as the nature of the material produced depends in each instance upon the particular reaction conditions employed. Generally, however, the polymers may be classified as poly aryl amines, bearing hydroxy or quinoid oxygen on the aromatic ring. Linkages are thru the amino group rather than the oxygen moiety of PAP. Among the polymer precursors which are present in the reaction mixture resulting from the catalytic hydrogenation process described above are quinonimines, meriquinonimines quinones, azoxybenzene, etc., and the radicals formed from these compounds.

In certain cases, e.g., for many non-pharmaceutical uses, the p-aminophenol can be separated from the crude reaction medium with a sufficient degree of purity by simply neutralization-precipitation. For many other uses, however, as for example, for use as an intermediate in preparing N-acetyl p-aminophenol (Acetaminophen) meeting the National Formulary (N.F.) specifications, simple precipitation from the reaction medium is insufficient. This is the case since many of the side products and impurities co-precipitate with PAP, and are difficultly separable therefrom.

It is thus advantageous to remove the deleterious side products and impurities which are present with the crude p-aminophenol, and certain proposals have been made for accomplishing this. British Pat. 1,028,078 proposes the washing, or extraction, of p-aminophenol with isopropanol or other aliphatic alcohols. This, however, fails to remove all classes of impurities.

Likewise, the extraction of p-aminophenol from its impurities with a solvent, or solvents, followed by recovery of the p-aminophenol from the solvent fails to afford a sufficiently pure product and is also uneconomical. See U.S. Pat. No. 2,013,394.

Neither of these methods is sufficient to remove the above mentioned polymeric tars and polymer precursors and color bodies from a nitrobenzene catalytic hydrogenation reaction medium and to permit conversion of the p-aminophenol to N-acetyl-p-aminophenol which meets the National Formulary specifications.

SUMMARY OF THE INVENTION

The present invention provides a method whereby p-aminophenol may be purified by removal of tars and thereby whitened considerably. More particularly the present invention provides a method for purifying p-aminophenol which has been produced by the catalytic hydrogenation of nitrobenzene in aqueous sulfuric acid.

Briefly, the method of the present invention comprises the recrystallization of the crude p-aminophenol from aqueous solutions of poly functional or poly basic acids having a pKa in the range of 2.12 to 3.9 and a pH of 10% aqueous solutions ranging from pH 1.7 to pH 3.0 such as glycolic, lactic, citric, or phosphoric acid. It has been found that when crude p-aminophenol is dissolved in dilute or concentrated solutions of these acids, many of the impurities present therein, particularly the above mentioned polymeric materials and polymer precursors, do not go into solution but rather precipitate out. The p-aminophenol containing acid solutions are separated from the undissolved impurities, charcoal treated, and then treated to precipitate the p-aminophenol product. This latter is conveniently accomplished by adjusting the pH of the acid solution to a value above 6, preferably 6.5 to 7.5 and most preferably 6.8 to 7.2. However, it is not essential that the tars be separated from the PAP solution prior to charcoal treatment. The above specifically denominated acids constituted presently preferred materials for use in the invention.

DETAILED DESCRIPTION OF THE INVENTION

Aqueous solutions of the above mentioned acids have been found to be highly advantageous recrystallization solvents for the purification of crude p-aminophenol. Many solvents have been tested as recrystallization solvents for the purification of crude p-aminophenol, particularly for the removal of the above described polymeric materials and polymer precursors, and have been found to be unsatisfactory. Among those previously tested include sulfuric acid, formic acid, acetic acid, water, aq. boric acid, aq. sulfamic acid, aliphatic alcohols, ethers and many hydrocarbons.

Sulfuric acid, often considered an equivalent of phosphoric acid for many applications, was found to be particularly disadvantageous in that a sulfuric acid solution of p-aminophenol quickly turns purple when the pH thereof is raised above 7.2. The poly functional acid solutions of p-aminophenol when adjusted to a pH above 7.2 do not change color as quickly as in the case of sulfuric acid solutions. Moreover, phosphoric acid solutions containing in excess of 20% p-aminophenol will not precipitate p-aminophenol at low temperatures and will not discolor rapidly when stored for long periods of time as a solution.

In addition, the poly functional acids do not operate to catalyze the polymerization of p-aminophenol, nor of the above described polymer precursors contained in the p-aminophenol or otherwise cause the formation of polymeric impurities. This has been found to be the case even in instances where the poly functional acid solutions of the p-aminophenol are heated.

Any of the different types of phosphoric acid may be utilized in the method of the present invention. For example, ortho-phosphoric, meta-phosphoric, pyro-phosphoric, super-phosphoric and any of the other well-known polyphosphoric acids may be employed. Although aqueous solutions of many of the above acids slowly revert to ortho-phosphoric acid, it is not necessary to permit this conversion to take place prior to employing the acid solutions as recrystallization solvents in the method of the invention.

The concentration of the poly functional acid employed as the recrystallization solvent is not overly critical. Generally, poly functional acid solutions having a concentration ranging from about 1 to about 50%, preferably from about 5 to about 10% may be utilized.

The amount of poly functional acids employed relative to the amount of p-aminophenol to be purified is likewise not particularly critical. It is only necessary that sufficient poly functional acids be used to ensure complete dissolution of the p-aminophenol. When utilizing poly functional acid solutions having concentrations as described above it is generally desirable to employ an amount of poly functional acid which will provide from about 0.2 to about 1 mole of poly functional acid per mole of p-aminophenol.

The purification process may be carried out simply by dissolving the crude-p-aminophenol in the aqueous poly functional acid recrystallization solvent. Preferably, although not necessarily, the p-aminophenol is dissolved in the aqueous poly functional acid at an elevated temperature, preferably about 75 to about 98° C. The polymeric impurities precipitate out as a tar-like material on the sides of the container. If desired, a decolorizing agent such as sodium hydrosulfite may be added to the solution at this point to further purify the p-aminophenol. A blanket of inert gas is used throughout the purification.

The poly functional acid solution of p-aminophenol may then be decanted from the precipitated impurities. The solution may then be contacted with an adsorbent such as activated charcoal to remove additional impurities contained therein, and centrifuged to yield a solution of the purified p-aminophenol.

The pH of the solution is then adjusted as described above to precipitate purified, white p-aminophenol. The pH of the solution may be adjusted utilizing ammonium hydroxide, alkali metal hydroxide, etc. The product is collected by filtration, centrifugation, etc. and dried. Such purified p-aminophenol was found to retain its white color for much longer periods of time than p-aminophenol which had not been treated in accordance with the method of the present invention, but rather had been recrystallized from other solvent mixtures.

The above described recrystallization process may be carried out at atmospheric or elevated pressure (using inert gas blanket).

Although the method of the invention has been described as being particularly effective for the purification of crude p-aminophenol produced by the catalytic hydrogenation of nitrobenzene process described in U.S. Pat. No. 3,383,416, it is to be understood that the method of the invention is applicable for the purification of crude p-aminophenol by whatever process produced. All such crude p-aminophenol preparation products contain impurities to some degree.

The invention will be further illustrated by the following non-limiting examples. Throughout the specification and claims and in the examples, unless otherwise indicated, parts and percentages are by weight. Parts by weight bear the same relationship to parts by volume as do grams to milliliters.

The p-aminophenol samples used in the following examples, except as otherwise indicated were obtained by the reduction of nitrobenzene with hydrogen in sulfuric acid as described in Example 1 of U.S. Pat. No. 3,383,416. The reduction is interrupted prior to completion. In order to facilitate separation of the catalyst suspended in the unreacted nitrobenzene, additional nitrobenzene is added after which the lower organic layer of catalyst suspended in nitrobenzene is separated from the upper aqueous layer of p-amino-phenol-containing solution. The upper aqueous layer is boiled to distill sufficient water to remove dissolved nitrobenzene, and the nitrobenzene-free solution containing p-aminophenol is obtained. The solution contains up to about .9% of p-aminophenol and up to 11 to 12% sulfuric acid.

EXAMPLE 1

45 g. (.413 m.) of dry crude purple p-aminophenol obtained from the hydrogenation of nitrobenzene in dilute sulfuric acid is dissolved in 382 g. of 6% phosphoric acid at 85° C. Sodium hydrosulfite (0.25 g.) is added to the dark solution for decolorization, with the black slimes clinging to the walls of the Ehrlenmeyer flask maintaining their dark color. The clear hot solution is decanted from the black tars, charcoal treated and filtered at 90° C. Adjustment of the cooled filtrate with ammonia to a pH of 6.8–7.2 causes a precipitation of white silky p-aminophenol, which is then collected on a filter and dried at 60° C. under vacuum. The dry p-aminophenol is white, and a 2% solution of the PAP is 10% aqueous acetic acid transmitted 95% of the light upon it measured at 515 millimicrons. (The original crude PAP transmits only 52% of the light.) It also maintains its light color for longer periods of time than does samples of p-aminophenol from the same source, which has been recrystallized from hot water and dilute sulfuric acid.

The slimy tars which remain in the recrystallization flask become black and brittle when dry. When redissolved in solvents, they form a dark red solution.

EXAMPLE 2

25 g. (.23 m.) of dry crude p-aminophenol prepared by hydrogenation of nitrobenzene in dilute sulfuric acid, is dissolved in 100 g. of 40% aqueous phosphoric acid at 80° C. At this temperature, the solution is decanted from the insoluble tars precipitated from p-aminophenol by the phosphoric acid. The decantate is treated with 2 g. of charcoal and filtered at 95° C.

When the filtrate is cooled to 20° C., no precipitate of p-aminophenol is observed until the pH is raised to 6.8–7.2 with aqueous ammonia. The precipitate which appears at this time is white and silky, and after collection on a filter and vacuum drying at 60° C., holds its color for a long period of time.

EXAMPLE 3

25 g. of dark brown p-aminophenol (52% transmission of 515 mμ wave length light through a 2% solution of this p-aminophenol in 10% aq. acetic acid solvent) is dissolved in 200 g. of 10% aq. glycolic acid at 85° C. under a nitrogen blanket. The solution is decanted from black viscous tars which cling to the walls of the dissolving vessel, and the decantate is then treated with 0.2 g. of charcoal, and a trace of sodium hydrosulfite and filtered at 90° C.

After the colorless filtrate has been cooled to 20–30° C., under nitrogen, gaseous ammonia is bubbled into the filtrate to raise the pH to 6.8–7.2, during which time white p-aminophenol precipitates. The p-aminophenol is collected on a filter and washed with cold water. Transmission of 515 m$\mu$ wave length light through a 2% solution of the filter cake in 10% aq. acetic acid is 99%.

EXAMPLE 4

25 g. of dark brown p-aminophenol (52% transmission of 515 m$\mu$ wave length light thru a 2% solution of this p-aminophenol in 10% aq. acetic acid solvent) is dissolved in 200 g. of 10% aq. lactic acid at 85° C. under a nitrogen blanket. The solution is decanted from black viscous tars which cling to the walls of the dissolving vessel, and the decantate is then treated with 0.2 g. of charcoal, and a trace of sodium hydrosulfite and filtered at 90° C.

After the colorles filtrate has been cooled to 20–30° C., under nitrogen, gaseous ammonia is bubbled into the filtrate to raise the pH to 6.8–7.2, during which time white p-aminophenol precipitates. The p-aminophenol is collected on a filter and washed with cold water. Transmission of 515 m$\mu$ wave length light through a 2% solution of the filter cake in 10% aq. acetic acid is 96%.

EXAMPLE 5

25 g. of dark brown p-aminophenol (52% transmission of 515 m$\mu$ wave length light through a 2% solution of this p-aminophenol in 10% aq. acetic acid solvent) is dissolved in 200 g. of 10% aq. citric acid at 85° C. under a nitrogen blanket. The solution is then treated with 0.2 g. of charcoal, and a trace of sodium hydrosulfite and filtered at 90° C.

After the colorless filtrate has been cooled to 20–30° C., under nitrogen, gaseous ammonia is bubbled into the filtrate to raise the pH to 6.8–7.2, during which time p-aminophenol precipitates. The p-aminophenol is collected on a filter and washed with cold water. Transmission of 515 m$\mu$ wave length light through a 2% solution of the filter cake in 10% aq. acetic acid is 99%.

EXAMPLE 6

25 g. of dark brown p-aminophenol (52% transmission of 515 m$\mu$ wave length light through a 2% solution of this p-aminophenol in 10% aq. acetic acid solvent) is dissolved in 200 g. of 10% aq. gluconic acid at 85° C. under a nitrogen blanket. The solution is decanted from black viscous tars which cling to the walls of the dissolving vessel, and the decantate is then treated with 0.2 g. of charcoal, and a trace of sodium hydrosulfite and filtered at 90° C.

After the colorless filtrate has been cooled to 20–30° C., under nitrogen, gaseous ammonia is bubbled into the filtrate to raise the pH to 6.8–7.2, during which time white p-aminophenol precipitates. The p-aminophenol is collected on a filter and washed with cold water. Transmission of 515 m$\mu$ wave length light through a 2% solution of the filter cake in 10% aq. acetic acid is 82%.

EXAMPLE 7

25 g. of dark brown p-aminophenol (52% transmission of 515 m$\mu$ wave length light through a 2% solution of the p-aminophenol in 10% aq. acetic acid solvent) is dissolved in 200 g. of 10% aq. phosphoric acid at 85° C. under a nitrogen blanket. The solution is then treated with 0.2 g. of charcoal, and a trace of sodium hydrosulfite and filtered at 90° C.

After the colorless filtrate has been cooled to 20–30° C., under nitrogen, gaseous ammonia is bubbled into the filtrate to raise the pH to 6.8–7.2, during which time white p-aminophenol precipitates. The p-aminophenol is collected on a filter and washed with cold water. Transmission of 515 m$\mu$ wave length light through a 2% solution of the filter cake in 10% aq. acetic acid is 95%.

I claim:

1. A method for eliminating impurities from crude p-aminophenol prepared by the catalytic hydrogenation of nitrobenzene in aqueous sulfuric acid, which comprises dissolving the crude p-aminophenol in an aqueous acid selected from the group consisting of phosphoric acids, lactic acid, glycolic acid and citric acid, separating the undissolved impurities from the resultant acid solution and precipitating the purified p-aminophenol by adjusting the pH of the acid solution to above 6.

2. The method according to claim 1, wherein the acid is aqueous phosphoric acid.

3. The method according to claim 2, wherein the concentration of said aqueous phosphoric acid is from about 1 to about 50% by weight.

4. The method according to claim 1 wherein dissolution of the crude p-aminophenol is carried out at an elevated temperature between about 75 and about 98° C.

5. The method according to claim 1 wherein the amount of aqueous acid employed is sufficient to provide from about 0.2 to about 1 mole of poly functional acid per mole of p-aminophenol.

6. A method for the elimination of polymeric and polymer precursor impurities from crude p-aminophenol prepared by the catalytic hydrogenation of nitrobenzene in aqueous sulfuric acid, which comprises dissolving said crude p-aminophenol in an aqueous acid selected from the group consisting of phosphoric acids, lactic acid, glycolic acid and citric acid to form a two-phase system containing a liquid phase comprising an aqueous poly functional acid solution of said p-aminophenol and a solid phase of said polymeric and polymer precursor impurities, separating said liquid phase from said solid phase, carbon treating the liquid phase, adjusting the pH of said liquid phase to 6.5–7.5 whereby said p-aminophenol is precipitated and separating the purified p-aminophenol.

7. The method according to claim 6, wherein dissolution of the crude p-aminophenol is carried out at an elevated temperature between about 75 and about 98° C.

8. The method according to claim 6 wherein said crude p-aminophenol is dissolved in aqueous phosphoric acid at an elevated temperature between about 75 and about 98° C.

9. The method according to claim 6 wherein the concentration of aqueous acid is from about 1 to about 50%.

10. The method according to claim 6 wherein the pH of said liquid phase is adjusted to 6.8–7.2.

References Cited

UNITED STATES PATENTS 3,383,416    5/1968    Benner _____ 260—575

FOREIGN PATENTS 708,645    4/1965    Canada _____ 260—575

LEWIS GOTTS, Primary Examiner

C. F. WARREN, Assistant Examiner